United States Patent [19]

Takijiri

[11] Patent Number: 4,785,999
[45] Date of Patent: Nov. 22, 1988

[54] PROCESS FOR PRODUCING GROUND CRUDE PIGMENT

[75] Inventor: Shunjiro Takijiri, Tokyo, Japan

[73] Assignee: Dainippon Ink and Chemicals, Inc., Tokyo, Japan

[21] Appl. No.: 686,629

[22] Filed: Dec. 31, 1984

Related U.S. Application Data

[63] Continuation of Ser. No. 406,966, Aug. 10, 1982, abandoned.

[30] Foreign Application Priority Data

Aug. 14, 1981 [JP] Japan ................... 56-126644

[51] Int. Cl.$^4$ ............................. B02C 19/12
[52] U.S. Cl. ........................... 241/26; 241/27
[58] Field of Search ............ 241/27, 26, 30, 46.11, 241/46.17, 172

[56] References Cited

U.S. PATENT DOCUMENTS

| | | | |
|---|---|---|---|
| 2,764,359 | 9/1956 | Szegvari | 241/46.17 X |
| 2,857,400 | 10/1958 | Cooper . | |
| 3,329,348 | 4/1967 | Pootmans | 241/30 |
| 3,872,103 | 3/1975 | Fabian . | |
| 4,039,346 | 8/1977 | Kranz . | |
| 4,141,904 | 2/1979 | Cabut et al. . | |
| 4,158,572 | 6/1979 | Blackburn et al. . | |
| 4,298,526 | 11/1981 | Sappok et al. . | |

FOREIGN PATENT DOCUMENTS

| | | | |
|---|---|---|---|
| 1288889 | 2/1969 | Fed. Rep. of Germany ... | 241/46.17 |
| 20588 | 7/1970 | Japan . | |
| 1486022 | 9/1977 | United Kingdom . | |
| 2039290 | 8/1980 | United Kingdom . | |

*Primary Examiner*—P. W. Echols
*Assistant Examiner*—Joseph M. Gorski
*Attorney, Agent, or Firm*—Sherman and Shalloway

[57] ABSTRACT

An improved process for producing a ground crude pigment by grinding in the dry state a crude pigment composed of a phthalocyanine compound or a polycyclic organic pigment compound, is achieved by using a grinding apparatus comprising a cylindrical receptacle having an axis in the longitudinal direction, a stirrer having a rotating shaft disposed along the axis of the receptacle and at least two pairs of arms, each pair having arms fixed to the rotating shaft and extending outwardly toward the side wall of the receptacle, and steel balls as a grinding medium filled in the receptacle.

18 Claims, 1 Drawing Sheet

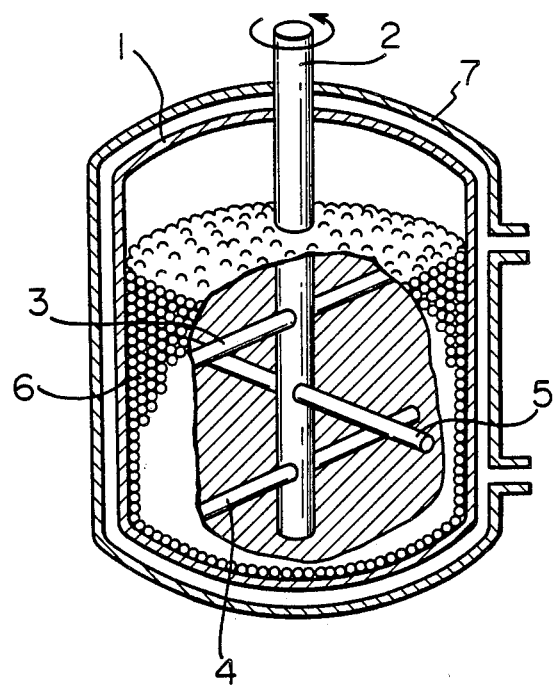

PROCESS FOR PRODUCING GROUND CRUDE PIGMENT

This application is a continuation of application Ser. No. 406,966, filed Aug. 10, 1982, now abandoned.

This invention relates to an improvement in a process for producing a ground crude pigment by grinding an as-synthesized phthalocyanine compound or polycyclic organic pigment compound, i.e. a so-called crude pigment.

As one means for converting a crude pigment, i.e. an as-synthesized phthalocyanine compound or polycyclic organic pigment compound, into a form usable as a pigment in practical applications, a method has previously been known which comprises mechanically grinding the crude pigment to form fine primary crystalline particles (first step) and then treating the crystalline particles with a solvent to convert them into a pigmentary state (second step). The primary crystalline particles obtained by the first step of this method cannot be directly used as a pigment because they are so fine as to be highly agglomerated and therefore have a low specific surface area and poor chroma and tinting strength. A pigment in this state is generally called a ground crude pigment. The ground crude pigment can be converted to a pigment of the desired crystal form having excellent chroma, tinting strength and dispersibility by solvent treatment in the second step.

This pigment-forming method is very effective in industrial applications and is widely used. The mechanical grinding in the first step, however, is considerably time-consuming, and, for example, requires as long as 6 hours in a ball mill (U.S. Pat. No. 2,857,400), 28 to 54 hours in a ball mill (Japanese Patent Publication No. 20588/1970), 24 hours in a ball mill (Japanese Laid-Open Patent Publication No. 97819/1974), 36 hours in a vibratory mill (Japanese Laid-Open Patent Publication No. 83421/1975), 56 hours in a ball mill (Japanese Laid-Open Patent Publication No. 157419/1975), 30 hours in a ball mill (Japanese Laid-Open Patent Publication No. 106126/1976), and 4 to 12 hours in a ball mill (Japanese Laid-Open Patent Publication No. 50230/1978). This is a great shortcoming in regard to manufacturing efficiency. Although varying considerably depending upon the type of the pigment to be ground, the manner of solvent treatment in the second step, the grade of the final desired pigment, etc., the time required for grinding in the first step is at least 4 hours in a ball or vibratory mill.

In order to obtain a copper phthalocyanine pigment of a $\beta$-form from crude copper phthalocyanine containing no substituent for which the aforesaid pigment-forming method is considered especially effective, it is believed to be preferable that its $\beta$-form crude pigment be ground in the dry state until it is partly changed to an $\alpha$-form to provide a mixture of $\alpha$-form crystals and $\beta$-form crystals (according to Japanese Laid-Open Patent Publications Nos. 157419/1975, 75453/1980 and 75454/1980, until the ratio of the $\alpha$-form crystals to the $\beta$-form crystals becomes 50–80% to 50–20%) before it is subjected to solvent treatment. The time required to perform grinding until such a state is reached is stated to be 30 hours in a ball mill.

The present inventor studied an advantgeous process for producing a ground crude pigment, and has found that a ground crude pigment can be produced with good efficiency within a very short period of time by grinding in the dry state a crude pigment composed of a phthalocyanine compound or polycyclic compound with vigorous stirring by using a grinding apparatus comprised of a cylindrical receptacle having an axis in the longitudinal direction, a stirrer having a rotating shaft disposed along the axis of the receptacle and at least two pairs of arms, each pair having arms fixed to the rotating shaft and extending outwardly toward the side wall of the receptacle, and steel balls as a grinding medium filled in the receptacle. In addition, it was unexpectedly found that the ground crude pigment obtained by the process of this invention makes the solvent treatment of the second step much easier than a ground crude pigment of the same grade obtained in a conventional manner by grinding for a long period of time in a ball mill or the like.

Since according to the dry grinding in the process of this invention, the ground material scarcely adheres to the side wall of the grinding receptacle and the steel balls, a very uniformly ground crude pigment can be obtained. On the other hand, according to the dry grinding by a known ball mill, etc., the ground material inevitably adheres to the side wall of the receptacle and the steel balls, and the grinding tends to become nonuniform.

The accompanying drawing is a perspective view, partially in section, of a preferred grinding apparatus used in the process of this invention. In the drawing, the reference numeral 1 represents a cylindrical grinding receptacle; 2, a rotating shaft, and each of 3, 4 and 5, a pair of arms fixed to the rotating shaft 2 and extending outwardly, preferably symmetrically with respect to the rotating shaft, toward the side wall of the receptacle 1. The number of arm pairs is three in the drawing, but may vary depending upon the size of the receptacle. Preferably, 2 to 20 pairs of arms can be provided. Steel balls 6 are used as a grinding medium and can be used in various diameters ranging especially from 1 inch to $\frac{1}{8}$ inch. The amount of the steel balls filled is usually 50% to 90% by volume, preferably 70% to 85% by volume, of the receptacle. The most advantageous amount is about 80% by volume in which the uppermost arm pair is apparently concealed. A heating and cooling jacket 7 is provided on the receptacle 1.

The dry grinding of the crude pigment is carried out by adding it little by little in an amount sufficient to fill the spaces between the filled steel balls in the grinding apparatus or in a slightly larger amount with agitation, and after adding all of the crude pigment, agitating it at a rotating speed of 50 to 400 rpm for 10 to 60 minutes, and up to 2 hours at the longest, so that a mixture of the steel balls and the crude pigment entirely moves vigorously. The aforesaid amount of the crude pigment varies depending upon the type of the crude pigment, but usually it is 1 to 10 parts by weight per 100 parts by weight of the steel balls.

According to the process of this invention, the time required for grinding can be shortened to one-tenth to one-twentieth of that required when a known ball mill or the like is used. Furthermore, the amount of the crude pigment per unit volume of the grinding receptacle, which is restricted in order to increase the grinding effect, can be increased to 2 to 2.5 times that which can be charged in the case of using a conventional ball mill or the like. Accordingly, grinding can be carried out with a very high level of efficiency.

The temperature of the inside of the grinding apparatus may reach more than 200° C. in the absence of cooling of its receptacle although it may vary depending upon the size of the receptacle. In many cases, grinding temmperatures of not more than 150° C. do not adversely affect the quality of the resulting ground crude pigment, but it is preferred to cool the inside of the receptacle to 110° C. or below.

After the grinding, the ground crude pigment is separated from the steel balls by filtratation, and after adding a suitable organic solvent, is heated with stirring to give a pigment having excellent chroma, tinting strength and dispersibility.

Examples of suitable organic solvents for use in the solvent treatment include alcohols such as methanol, ethanol, propanol, butanol and amyl alcohol; ketons such as acetone, methyl ethyl ketone, methyl isobutyl ketone, methyl propyl ketone and diethyl ketone; esters such as butyl formate, methyl acetate, ethyl acetate, isopropyl acetate, butyl acetate and amyl acetate; ethers such as diisopropyl ether, ethyl butyl ether, methyl Cellosolve, ethyl Cellosolve, tetrahydrofuran, dioxane and acetal; halogenated hydrocarbons such as carbon tetrachloride, trichlormethane, trichloroethane, tetrachlorethane, trichloroethylene, tetrachloroethylene, monochlorobenzene, and dichlorobenzene; benzene; aromatic hydrocarbons such as benzene, toluene and xylene; amines such as dimethylformamide, pyridine, morpholine and aniline; and mixtures of these. Of these, propanol, butanol, methyl ethyl ketone, methyl isobutyl ketone, carbon tetrachloride, trichloroethane, tetrachloroethane, trichloroethylene, tetrachloroethylene and dimethylformamide are preferred. The solvent treatment may be carried out in the presence of water, and in order to obtain a stirrable slurry of the ground crude pigment, a mixture of the organic solvent and water may be used.

The amount of the organic solvent used is usually 10 to 2,000 parts by weight, preferably 100 to 1,000 parts by weight, per 100 parts by weight of the ground crude pigment.

The temperature and time required for the solvent treatment vary according to the types of the pigment and the organic solvent used. Generally, it is carried out at room temperature to 150° C. for 0.5 to 10 hours.

There is no particular limitation on the type of the crude pigment to which the process of this invention is applied. Marked effects can be obtained, however, when it is applied to phthalocyanine compounds or polycyclic organic pigment compounds. Almost all metal phthalocyanines including copper phthalocyanine, cobalt phthalocyanine, nickel phthalocyanine, iron phthalocyanine and zinc phthalocyanine can be used, and metal-free phthalocyanines can also be used in this invention. These phthalocyanines may include not only unsubstituted compounds but also various substituted compounds, for example mono- to polyhalogenated compounds. Examples of the polycycnic organic pigment compounds are pigment compounds of the perylene, perinone, quinacridone, isoindolinone, dioxazine, indanthrone, thioindigo and anthanthrone series, either unsubstituted or substituted.

A greater grinding effect may be obtained by grinding the crude pigment in the presence of an inorganic grinding aid such as sodium chloride or sodium sulfate or an organic grinding aid such as phthalimide or urea in the process of this invention. Grinding in the presence of grinding aids is not entirely advantageous for the production of a ground crude pigment because the yield of the ground crude pigment per batch is decreased by the amount of the grinding aid used. It is an effective means, however, when pigment formation from a crude pigment is to be performed in one step.

The following examples illustrate the present invention in greater detail. All parts and percentages in these examples are by weight.

EXAMPLE 1

A grinding apparatus was used which was comprised of a 5-liter grinding receptacle, a stirrer having a rotating shaft driven by a 2.2 KW motor and five pairs of arms fixed to the rotating shaft and extending outwardly toward the side wall of the grinding receptacle, 13 kg of steel balls each having a diameter of $\frac{3}{8}$ inch, and a jacket for water cooling. The apparatus was charged with 550 g of a crude unsubstituted $\beta$-form copper phthalocyanine while passing cooling water at 15° C. through the jacket, and the crude pigment was agitated together with the steel balls at 100 rpm for 5 minutes and then at 300 rpm for 30 minutes to grind it. The maximum current passed was 6.5A, and the temperature of the inside of the grinding receptacle was 45° C.

The ground product was separated from the steel balls by filtration to give 533 g of a ground crude pigment of a bronze color with a shade of reddish violet. X-ray diffraction analysis showed that this crude pigment was a mixture of 70% of $\alpha$-form and 30% of $\beta$-form. The crude pigment was stirried in a customary manner in 10 times its weight of n-butanol at 100° C. for 1 hour to give a copper phthalocyanine pigment which showed a diffraction spectrum of a complete $\beta$-form in an X-ray diffraction test and which was brilliant and had a high tinting strength and excellent dispersibility.

COMPARATIVE EXAMPLE 1

Steel balls (5 kg) having a diameter of $\frac{3}{8}$ inch were filled in a 5-liter ball mill, and 300 g of a crude unsubstituted $\beta$-form copper phthalocyanine pigment was added. The crude pigment was ground in the dry state by rotating the ball mill at a speed of 60 rpm. A period of 55 hours was required until the proportion of $\alpha$-form in the ground pigment reached 70%. When the resulting ground crude pigment consisting of 70% of $\alpha$-form and 30% of $\beta$-form was stirred in 10 times its weight of n-butanol at 100° C., about 10% of the unconverted $\alpha$-form remained after the lapse of 1 hour, and the stirring under heat should be performed for 4 hours until the treated pigment showed a diffraction spectrum of a complete $\beta$-form on X-ray examination.

EXAMPLE 2

A grinding apparatus was used which was comprised comprised of a 140-liter grinding receptacle, a stirrer having a rotating shaft driven by a 37 KW motor and eight pairs of arms fixed to the shaft and extending outwardly toward the side wall of the grinding receptacle, 450 kg of steel balls each having a diameter of $\frac{3}{8}$ inch and a jacket for water cooling. The apparatus was charged with 25 kg of a crude unsubstituted $\beta$-form copper phthalocyanine blue pigment, and it was agitated together with the steel balls at 50 rpm for 1 minute, and then at 150 rpm for 45 minutes while passing cooling water at 25° C. at a rate of 100 liters/min. The maximum current passed was 69A, and the temperature of the inside of the receptacle was 102° C.

The ground product was separated from the steel balls to give 24.5 kg of a ground crude pigment having a bronze color with a shade of reddish violet. X-ray diffraction analysis showed that it was a mixture of 68% of α-form and 32% of β-form. The ground crude pigment was treated with solvent in the same way as in Example 1 to give a brilliant β-form copper phthalocyanine pigment having the same tinting strength and dispersibility as the product obtained in Example 1.

EXAMPLE 3

A ground crude pigment was prepared in the same way as in Example 1 except that the grinding at 300 rpm was carried out for 50 minutes. The temperature of the inside of the receptacle was 60° C.

The ground crude pigment obtained was a mixture of 78% of α-form and 22% of β-form. It was boiled and agitated in 10 times its weight of a 1:1 (by weight) mixture of methyl isobutyl ketone and water for 4 hours to give a brilliant β-form copper phthalocyanine pigment having the same tinting strength and dispersibility as the product obtained in Example 1.

EXAMPLE 4

Six hundred grams of a crude monochlorinated copper phthalocyanine pigment having a chlorine content of 5.8% was charged into the same grinding apparatus as used in Example 1, and agitated at 100 rpm for 5 minutes and then at 250 rpm for 20 minutes to grind it. The maximum current passed was 6.3A, and the temperature of the inside of the grinding receptacle was 43° C. The product was separated from the steel balls by filtration to give 588 g of a ground crude pigment having a bronze color with a shade of reddish violet.

The ground crude pigment was boiled and agitated in a customery manner in 10 times its weight of isopropanol to give a crystal-stable copper phthalocyanine blue pigment which had a high tinting strength and excellent dispersibility.

COMPARATIVE EXAMPLE 2

Three hundred grams of a crude monochlorinated copper phthalocyanine pigment having a chlorine content of 5.8% was charged in the same ball mill as used in Comparative Example 1, and ground at 60 rpm for 30 hours. The ground crude pigment obtained was boiled and agitated in 10 times its weight of isopropanol for 1 hour. The tinting strength of the pigment obtained was 75% of that of the pigment obtained in Example 4 and did not reach more than 85% even when the boiling and stirring was performed for 4 hours.

EXAMPLE 5

Example 4 was followed except that steel balls having a diameter of 3/16 inch were used instead of the steel balls having a diameter of ⅜ inch. A copper phthalocyanine blue pigment having an equivalent quality to the product obtained in Example 4 was obtained.

EXAMPLE 6

Five hundred grams of a crude quinacridone pigment in a γ crystal form was charged into the same grinding apparatus as used in Example 1, and agitated at 100 rpm for 5 minutes and then at 300 rpm for 40 minutes to grind it. The maximum current passed was 5.8A, and the temperature of the inside of the receptacle was 47° C. The product was separated from the steel balls by filtration to give 490 g of a ground crude pigment having a brown color and a metallic luster.

The crude pigment was boiled and agitated in a customary manner in a solvent consisting of 1 times its weight of carbon tetrachloride and 10 times its weight of water for 1 hour to give a quinacridone red pigment having a brillant hue, a high tinting strength and excellent dispersibility.

COMPARATIVE EXAMPLE 3

A crude quinacridone pigment in γ crystal form (280 g) was charged into the same ball mill as used in Comparative Example 1, and ground at 60 rpm for 35 hours. The ground crude pigment was boiled and agitated in a solvent consisting of 1 times its weight of carbon tetrachloride and 10 times its weight of water for 1 hour. The tinting strength of the resulting pigment was 85% of that of the pigment obtained in Example 6, and was 95% when the boiling was carried out for 4 hours.

EXAMPLE 7

Crude perylene tetracraboxylic acid dianhydride (650 g) was charged into the same grinding apparatus as used in Example 1, and agitated at 100 rpm for 5 minutes and then at 300 rpm for 20 minutes to grind it. The maximum current passed was 6.5A, and the temperature of the inside of the receptacle was 44° C. The product was separated from the steel balls by filtration to give 636 g of a ground crude pigment having a brown color and a metallic luster.

The ground crude pigment was stirred in a customary manner in 5 times its weight of N,N-dimethylformamide at 120° C. for 1 hour to give a perylene red pigment having a full reddish shade, a high tinting strength and excellent dispersibility.

COMPARATIVE EXAMPLE 4

Crude perylene tetracraboxylic acid dianhydride (350 g) was charged into the same ball mill as used in Comparative Example 1, and ground at 60 rpm for 24 hours. The ground crude pigment was heat-treated in 5 times its weight of N,N-dimethylformamide at 120° C. for 1 hour. The tinting strength of the resulting pigment was 90% of that of the pigment obtained in Example 7, and in order to obtain an equivalent tinting strength, a period of 4 hours was required to heat-treat the ground crude pigment.

EXAMPLE 8

Five hundred grams of a crude dioxazine violet pigment was charged into the same grinding appartus as used in Example 1 and agitated at 100 rpm for 1 minute and then at 300 rpm for 10 minutes. The maximum current passed was 6.5A, and the temperature of the inside of the receptacle was 40° C.

The product was separated from the steel balls to give 496 g of a dark green powder having a golden metallic luster. The ground crude pigment was then dispersed in 15 times its weight of water, and while adding dropwise a xylene-water emulsion of the following composition in an amount 2.1 times the weight of the ground crude pigment, stirred at 85 to 90° C. for 2 hours to give a brilliant dioxazine violet pigment having excellent tinting strength and dispersibility.

COMPOSITION OF THE XYLENE-WATER EMULSION

Xylene: 100 parts
Nonylphenyl ether: 5 parts
Water: 2000 parts

EXAMPLE 9

Five hundred grams of a crude indanthrene blue pigment was charged into the same grinding apparatus as used in Example 1, and agitated at 100 rpm for 1 minute and then at 300 rpm for 30 minutes to grind it. The maximum current was 6.5A, and the temperature of the inside of the receptacle was 46° C.

The product was separated from the steel balls to give 497 g of a ground crude pigment having a bronze color with a shade of reddish violet. The ground crude pigment was agitated in 10 times its weight of aniline at 100° C. for 1 hour to give an indanthrene blue pigment having a brilliant shade, and excellent tinting strength aid dispersibility.

EXAMPLE 10

The same grinding apparatus as used in Example 1 was charged with 400 g of a crude chlorinated copper phthalocyanine pigment having a chloride content of 48.5% and 2000 g of sodium chloride. They were agitated at 100 rpm for 1 minute and then at 250 rpm for 20 minutes to grind the crude pigment. The maximum current passed was 6.4A, and the temperature of the inside of the receptacle was 40° C.

The product was separated from the steel balls to give 2330 g of a mixture of a ground crude pigment and sodium chloride. The mixture was boiled and stirred in 3 times its weight of xylene for 1 hour. Xylene was removed by steam distillation, and the residue was washed with water to remove sodium chloride to give a highly chlorinated copper phthalocyaning green pigment having a brilliant bluish green color and excellent tinting strength and dispersibility.

What is claimed is:

1. In a process for producing a ground crude pigment by grinding in a dry state unsubstituted β-form copper phthalocyanine, the improvement which comprises dry grinding the crude pigment in a grinding apparatus comprising a cylindrical receptacle having a side wall and a bottom wall and having an axis in a longitudinal direction, a stirrer having a rotating shaft disposed along the axis of the receptacle and at least two pairs of arms, each pair having arms fixed to the rotating shaft and extending outwardly toward the side wall of the receptacle, and steel balls as a grinding medium filled in the receptacle until the ratio of the α-form crystals to the β-form crystals become 50%–80% to 50%–20%.

2. The process of claim 1 wherein the stirrer has 2 to 20 pairs of arms, each pair having arms extending outwardly and symmetrically with respect to the shaft.

3. The process of claim 1 or 2 wherein the steel balls have a diameter of 1 to ⅛ inch and occupy 70% to 85% of the entire volume of the receptacle.

4. The process of claim 3 wherein there are spaces between the steel balls filled in the receptacle and wherein the crude pigment is gradually added to the receptacle to substantially fill the spaces between the steel balls while slowly agitating the grinding medium to facilitate said filling and, thereafter carrying out the grinding by agitating at a rotating speed of 50 to 400 rpm for 10 to 60 minutes.

5. The process of claim 4 wherein the crude pigment is filled into the receptacle in an amount of from 1 to 10 parts by weight per 100 parts by weight of the steel balls of the grinding medium.

6. The process of claim 5 wherein the steel balls have a diameter of from 1 to ⅛ inch and occupy 70% to 85% of the volume of the receptacle.

7. The process of claim 1 wherein after all of the crude pigment has been put in the receptacle, the stirrer is operated at a rotating speed of 50 to 400 rpm.

8. The process of claim 1 wherein the crude pigment is ground in an amount of 1 to 10 parts by weight per 100 parts by weight of the steel balls.

9. The process of claim 1 wherein the grinding of the crude pigment is carried out at a temperature of not more than 150° C.

10. The process of claim 1 which comprises grinding the crude pigment for a period of up to 2 hours.

11. The process of claim 1 which comprises grinding the crude pigment for a period of 10 to 60 minutes.

12. In a two step method for converting a crude as-synthesized compound pigment to the corresponding compound pigment of predetermined crystal form wherein the crude pigment is first dry ground to form fine highly agglomerated primary crystalline particles and thereafter the crystalline particles are treated with a solvent to convert the crystalline particles to a pigmentary state, the improvement which comprises dry grinding the crude pigment for up to 2 hours in a grinding apparatus comprising a cylindrical receptacle having a side wall and a bottom wall and having an axis in a longitudinal direction, a stirrer having a rotating shaft disposed along the axis of the receptacle and at least two pairs of arms, each pair having arms fixed to the rotating shaft and extending outwardly toward the side wall of the receptacle, and steel balls as a grinding medium filled in the receptacle.

13. The method of claim 12 wherein the crude as-synthesized pigment is an unsubstituted β-form copper phthalocyanine, the predetermined crystal form is the α-form crystals and the dry grinding is continued until the ratio of the α-form crystals to the β-form crystals becomes 50%–80% to 50%–20%.

14. The process of claim 12 wherein the crude as-synthesized pigment is a crude quinacridone-series organic pigment.

15. The process of claim 12 wherein the crude as-synthesized pigment is a crude dioxazine-series organic pigment.

16. The process of claim 12 wherein the crude as-synthesized pigment is a crude perylene-series organic pigment.

17. The process of claim 12 wherein the crude as-synthesized pigment is a crude indanthrone-series organic pigment.

18. The process of claim 12 wherein the crude as-synthesized pigment is crude phthalocyanine-series organic pigment.

* * * * *